United States Patent
Um et al.

(10) Patent No.: US 7,890,250 B2
(45) Date of Patent: Feb. 15, 2011

(54) NAVIGATION SYSTEM AND CONTROLLING METHOD FOR THE MOTOR VEHICLE

(75) Inventors: Bong Su Um, Gyeonggi-do (KR); Dong Won Na, Gyeonggi-do (KR); Jun Woo Lee, Seoul (KR)

(73) Assignee: SK Telecom Co., Ltd., Seoul (KR)

( * ) Notice: Subject to any disclaimer, the term of this patent is extended or adjusted under 35 U.S.C. 154(b) by 809 days.

(21) Appl. No.: 10/500,081

(22) PCT Filed: Oct. 21, 2003

(86) PCT No.: PCT/KR03/02200

§ 371 (c)(1),
(2), (4) Date: Jun. 23, 2004

(87) PCT Pub. No.: WO2004/038676

PCT Pub. Date: May 6, 2004

(65) Prior Publication Data

US 2005/0080553 A1    Apr. 14, 2005

(30) Foreign Application Priority Data

Oct. 23, 2002    (KR) .................... 10-2002-0064839

(51) Int. Cl.
*G01C 21/00* (2006.01)
*G01C 21/30* (2006.01)
*G01C 21/32* (2006.01)
*G08G 1/123* (2006.01)

(52) U.S. Cl. ............... 701/201; 701/202; 701/205; 701/206; 701/209; 701/210; 340/995.1; 340/995.17; 340/995.18; 340/995.21; 340/995.23

(58) Field of Classification Search ........... 701/202, 701/26; 714/750; 700/13
See application file for complete search history.

(56) References Cited

U.S. PATENT DOCUMENTS 5,774,073 A * 6/1998 Maekawa et al. ...... 340/995.21

(Continued)

FOREIGN PATENT DOCUMENTS

CN    1441260    9/2003

(Continued)

OTHER PUBLICATIONS

Office Action dated Oct. 13, 2006, for Chinese Patent Application No. 2003801002659.

*Primary Examiner*—Khoi Tran
*Assistant Examiner*—Nicholas Kiswanto
(74) *Attorney, Agent, or Firm*—Lowe Hauptman Ham & Berner LLP (57) ABSTRACT

A navigation system (20) includes a transceiver unit (210), a display unit (250), an input unit (260) and an ECU (230). The transceiver unit (210) transmits a signal for demanding a detection of a navigation path to a path detecting server (10) and then receives path data which represent the navigation path from the path detecting server (10). The display unit (250) outputs the navigation path or a revised navigation path. The ECU (230) conveys data on a departure point and a destination from the input unit (260) to the transceiver unit (210) and transfers the path data from the transceiver unit (210) to the display unit (250). Further, the ECU (270) precalculates deviation-expected paths in the course of driving along the navigation path and selects the revised navigation path among the precalculated deviation-expected paths in case a present position of a mobile object deviates from the navigation path to thereby provide the revised navigation path to the display unit (250).

10 Claims, 5 Drawing Sheets

U.S. PATENT DOCUMENTS

| | | | |
|---|---|---|---|
| 5,911,773 A * | 6/1999 | Mutsuga et al. | 701/200 |
| 5,931,888 A * | 8/1999 | Hiyokawa | 701/208 |
| 6,249,740 B1 * | 6/2001 | Ito et al. | 701/200 |
| 6,347,278 B2 * | 2/2002 | Ito | 701/200 |
| 6,351,709 B2 * | 2/2002 | King et al. | 701/210 |
| 6,507,785 B1 * | 1/2003 | Stefan et al. | 701/210 |
| 6,950,745 B2 * | 9/2005 | Agnew et al. | 701/210 |
| 6,970,783 B2 * | 11/2005 | Knockeart et al. | 701/201 |
| 7,050,905 B2 * | 5/2006 | Nemeth | 701/201 |
| 7,149,625 B2 * | 12/2006 | Mathews et al. | 701/209 |
| 7,184,886 B1 * | 2/2007 | Krull et al. | 701/209 |
| 2002/0169549 A1 * | 11/2002 | Kaplan | 701/213 |
| 2003/0163253 A1 | 8/2003 | Lee et al. | |

FOREIGN PATENT DOCUMENTS

| | | |
|---|---|---|
| JP | 11-295096 | 10/1999 |
| JP | 2000 131086 A | 5/2000 |
| WO | WO 99/09374 A2 | 2/1999 |

* cited by examiner

NAVIGATION SYSTEM AND CONTROLLING METHOD FOR THE MOTOR VEHICLE

TECHNICAL FIELD

The present invention relates to a navigation system and a method for controlling same; and, more particularly, to the navigation system and the method for controlling same, which informs a driver in a vehicle of a rerouted navigation path in case the vehicle deviates from a navigation path.

BACKGROUND OF THE INVENTION

Conventional navigation systems are usually mounted in mobile objects such as a vehicle, a vessel, an airplane and the like, so as to detect a current position, a proceeding direction and a speed thereof.

The conventional navigation system detects the current position of a mobile object based on GPS (global positioning system) signals indicating information on longitude, latitude, and altitude thereof, which are received from a plurality of satellites, and displays the detected current position of the object on a map visualized through a display device. The navigation system also searches for a navigation path, i.e., a short-cut path or an optimum path from a departure point to a destination, and display the navigation path on the map visualized through the display device.

Figure 1:
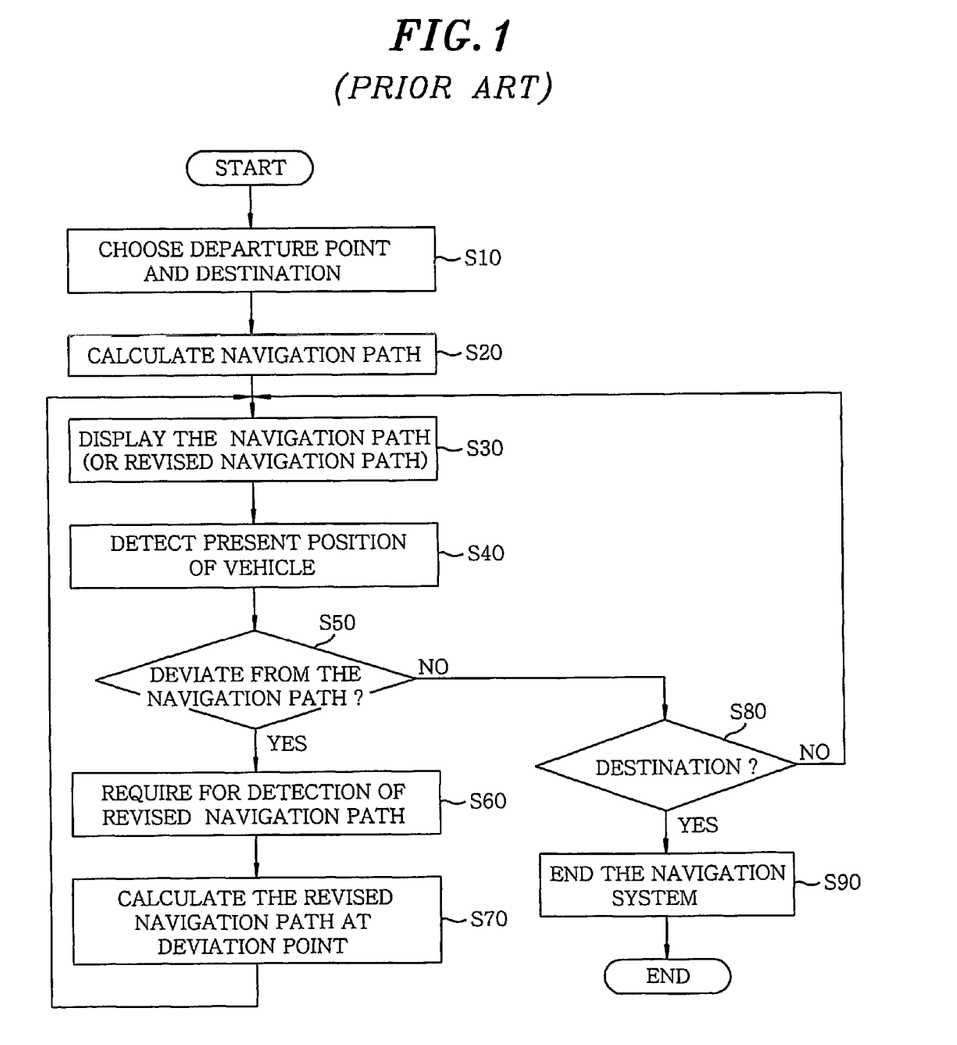
FIG. 1 is a flow chart showing a conventional method for controlling a navigation system.

FIG. 1 is a flow chart showing a conventional method for controlling a navigation system. In case a vehicle deviates from a navigation path, the navigation system operates as follows.

After the navigation system receives a command signal to detect a navigation path, the signal being inputted by a driver, the navigation system transmits the signal to a path detecting server via a wireless network (S 10). Then, the path detecting server figures out the navigation path by using a route planning method to thereby provide path data, which represents the navigation path, to the navigation system via the wireless network (S 20).

The navigation system displays the navigation path on a screen such as an LCD and the like in response to the path data (S 30).

A navigation sensor unit included in the navigation system detects a present position of the vehicle in the course of displaying the navigation path (S 40).

The navigation system determines whether the present position of the vehicle deviates from the navigation path or not (S 50). When the present position of the vehicle deviates from the navigation path, the navigation system sends a signal demanding a detection of a revised navigation path to the path detecting server (S 60).

Subsequently, the path detecting server figures out the revised navigation path required by the navigation system. Herein, the revised navigation path means a new navigation path from a deviation point to the destination (S 70), wherein the deviation point is a place where the vehicle begins to deviate from the navigation path.

Thereafter, the path detecting server transmits revised path data, which indicates the revised navigation path, to the navigation system via the wireless network. Then, the navigation system displays the revised navigation path in response to the revised path data (S 30).

However, in step 50, if the vehicle is determined to continue to travel along the original navigation path, the navigation system determines whether the vehicle has arrived at the destination or not (S 80).

If the vehicle has arrived at the destination, the operation of the navigation system is completed (S 90); otherwise, the navigation system returns to step 30 to display the navigation path.

As mentioned above, when the vehicle deviates from the original navigation path, the conventional navigation system does not inform the driver of a revised navigation path until the navigation system demands a detection of the revised navigation path to the path detecting server and then receives the revised path data from the path detecting server. Therefore, there is a time delay problem in finding the revised navigation path.

SUMMARY OF THE INVENTION

It is, therefore, a primary object of the present invention to provide a navigation system and a method for controlling same which informs a driver in a vehicle of a revised navigation path, which has been precalculated, in case the vehicle deviates from an original navigation path so that a time delay required to acquire the revised navigation path is greatly reduced.

In accordance with one aspect of the present invention, there is provided a navigation system for use in a mobile object, including: a transceiver unit for transmitting a signal for demanding a detection of a navigation path, which is a short-cut path or an optimum path from a departure point to a destination, to a path detecting server via a wireless network and then receiving path data which represents the navigation path from the path detecting server via the wireless network; a display unit for outputting the navigation path or a revised navigation path; an input unit for inputting data on the departure point and the destination; and an ECU for transferring the data on the departure point and the destination from the input unit to the transceiver unit, transferring the path data from the transceiver unit to the display unit, precalculating deviation-expected path data which represent deviation-expected paths in the course of driving along the navigation path, and selecting revised path data which represent the revised navigation path, among the precalculated deviation-expected path data in case a present position of the mobile object deviates from the navigation path to thereby provide the revised navigation path to the display unit.

In accordance with another aspect of the present invention, there is provided a method for navigating a mobile object traveling from a departure point to a destination, including the steps of: (a) transmitting a signal for demanding a detection of a navigation path, which is a short-cut path or an optimum path from the departure point to the destination, to a path detecting server via a wireless network; (b) receiving path data which represent the navigation path from the path detecting server via the wireless network; (c) displaying the navigation path in response to the received path data; (d) precalculating deviation-expected path data which represent deviation-expected paths; (e) selecting revised path data, which represent a revised navigation path, among the precalculated deviation-expected path data in case a present position of the mobile object deviates from the navigation path; and (f) displaying the revised navigation path in response to the revised path data.

BRIEF DESCRIPTION OF DRAWINGS

The above and other objects and features of the present invention will become apparent from the following description of preferred embodiments, given in conjunction with the following drawings, in which.

DETAILED DESCRIPTION OF THE INVENTION

Figure 2:
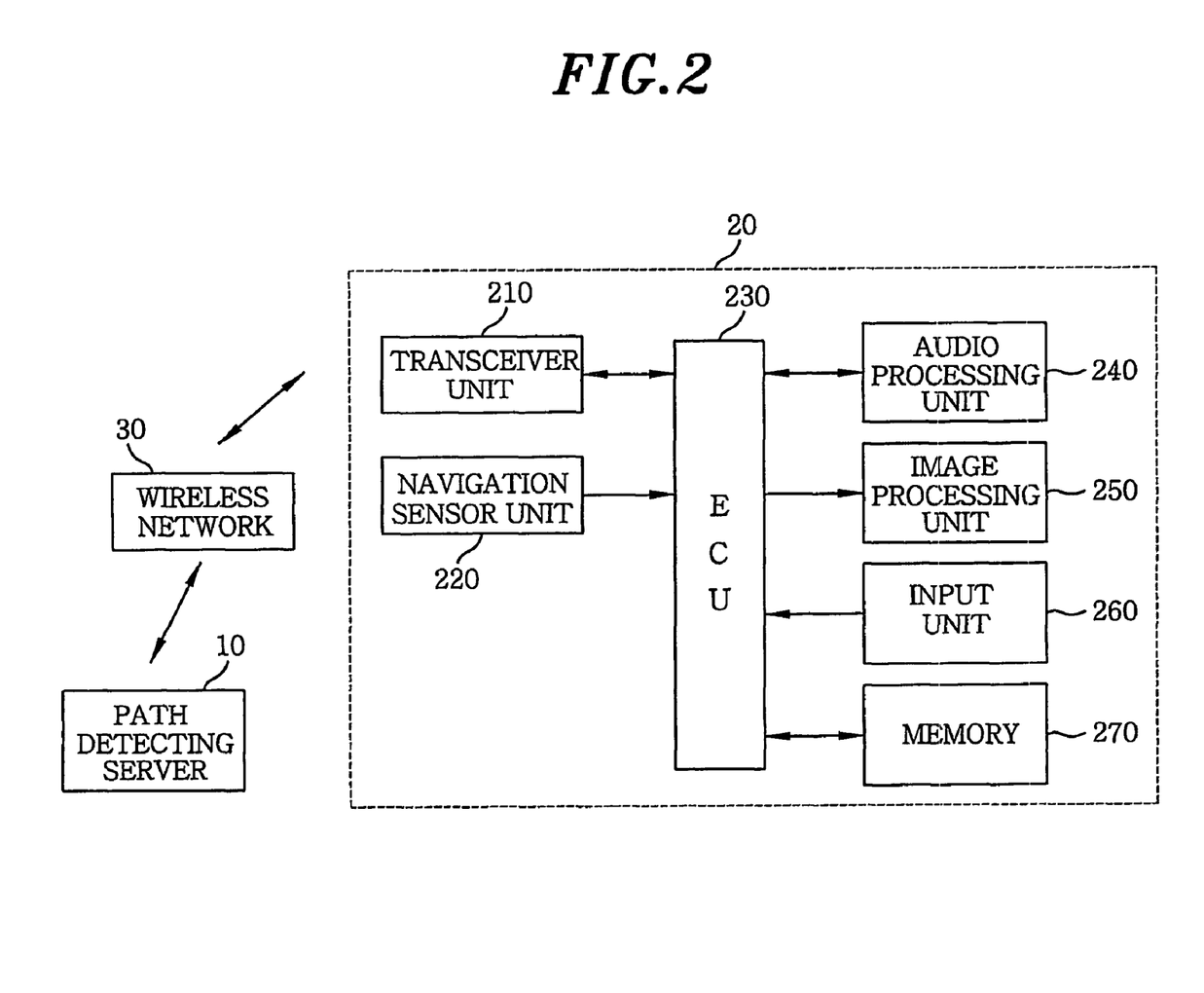
FIG. 2 shows a structure of a navigation system in accordance with a preferred embodiment of the present invention.

FIG. 2 shows a structure of a navigation system in accordance with a preferred embodiment of the present invention. The navigation system may be installed in a mobile object such as an automobile. As shown in FIG. 2, the navigation system includes a path detecting server 10, a navigation system 20 and a wireless network 30.

The navigation system 20 includes a transceiver unit 210, a navigation sensor unit 220, an ECU (electronic control unit) 230, an audio processing unit 240, an image processing unit 250, an input unit 260 and a memory 270.

Initially, a driver inputs to the navigation system 20 data on a departure point and a destination through the input unit 260 and/or the audio processing unit 240. Then, the ECU 230 transmits the data from the input unit 260 or the audio processing unit 240 to the transceiver unit 210. After the transceiver unit 210 receives the data, the transceiver unit 210 transmits the data and a signal for demanding a detection of a navigation path to the path detecting server 10 via the wireless network 30. The navigation path represents a short-cut path or an optimum path from the departure point to the destination. The path detecting server 10 begins to detect the navigation path in response to the signal. After the navigation path is detected, the path detecting server 10 transmits path data representing the navigation path to the transceiver unit 210 via the wireless network 30. Thereafter, the ECU 230 transmits the path data from transceiver unit 210 to the audio processing unit 240 and/or the image processing unit 250.

In the meantime, the navigation sensor unit 220 measures a present position of the vehicle. And then the navigation sensor unit 220 transmits data representing the measured present position of the vehicle to the ECU 230 when the data is demanded by the ECU 230. The navigation sensor unit 220 includes a GPS receiver for receiving GPS signals and a plurality of sensors for perceiving a rotational motion and a speed of the vehicle.

The audio processing unit 240 receives the path data from the ECU 230 and then outputs the path data in the form of an audio signal. On the other hand, the audio processing unit 240 can be served as an input device. That is, the driver can input the data on the departure point and the destination through the audio processing unit 240 in the form of the audio signal, i.e., the voice of the driver.

The image processing unit 250 displays the navigation path and the present position of the vehicle on a map which is displayed on a screen such as an LCD and the like.

The input unit 260 transmits the data of the departure point and the destination, which are inputted therethrough by the driver, to the ECU 230.

The memory 270 stores the path data or deviation-expected path data which are received through the transceiver unit 210 via the ECU 230. Herein, the deviation-expected path data represent new navigation paths from optional deviation points to the destination. Moreover, the deviation-expected paths are precalculated in the course of traveling along the original navigation path. The memory 270 transmits the stored path data (or the deviation-expected path data) to the ECU 230 when the ECU 230 requests the data in order to display the data through the audio processing unit 240 and/or the image processing unit 250.

The ECU 230 displays the path data through the audio processing unit 240 and/or the image processing unit 250 in case the vehicle proceeds along the original navigation path. Meanwhile, the ECU 230 precalculates the deviation-expected path data by using the path data and a map structure comprising links, nodes and the like. Thereafter, the ECU 230 stores the deviation-expected path data in the memory 270. Moreover, the ECU 230 determines whether or not the present position of the vehicle calculated by the navigation sensor unit 220 is located on the original navigation path. In case the present position of the vehicle deviates from the navigation path, the ECU 230 immediately sends a signal to demand the audio processing unit 240 or the image processing unit 250 to display a revised navigation path which is selected among the deviation-expected paths by inspecting which of the deviation-expected paths includes the present position of the vehicle. The revised navigation-path represents a new navigation path from a deviation point to the destination. The deviation point is the place where the vehicle begins to deviate from the navigation path.

Figure 3:
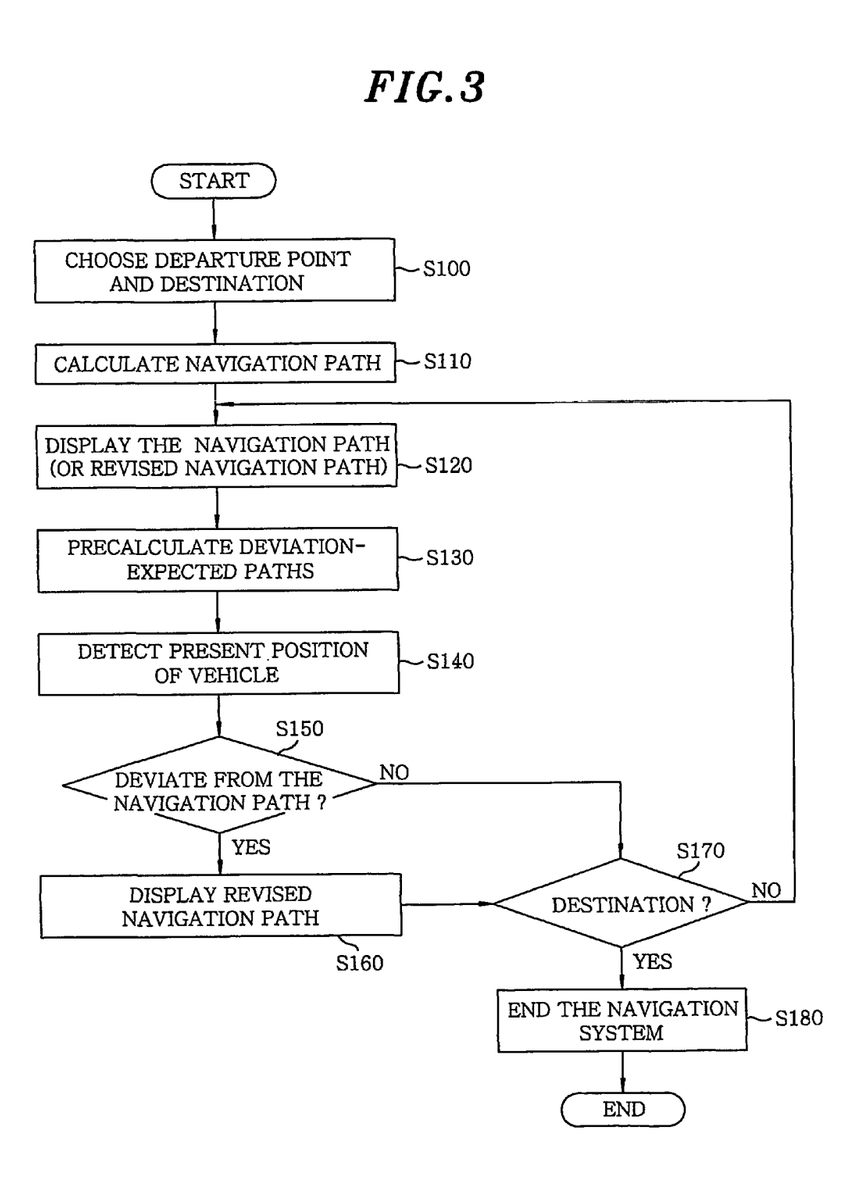
FIG. 3 represents a flow chart showing a method for controlling the navigation system in accordance with the preferred embodiment of the present invention.

FIG. 3 shows a flow chart showing a method for controlling the navigation system in accordance with the preferred embodiment of the present invention. With reference to FIGS. 2 and 3, the method for controlling the navigation system will be described in detail.

First, the driver inputs data on the departure point and the destination by using the input unit 260 and/or the audio processing unit 240. The data are transmitted to the transceiver unit 210 via the ECU 230. Thereafter, the transceiver unit 210 sends a signal for demanding a detection of a navigation path to the path detecting server 10 via the wireless network 30 (S 100).

And then, the path detecting server 10 calculates the navigation path, i.e., a short-cut path or an optimum path from the departure point to the destination, to thereby provide path data, which represents the navigation path, to the transceiver unit 210 via the wireless network 30 (S 110).

The transceiver unit 210 transmits the path data to the ECU 230, which then stores the path data in the memory 270 and orders the image processing unit 250 and/or the audio processing unit 240 to display the present position of the vehicle and the navigation path (S 120).

In the course of displaying the navigation path, deviation-expected path data are precalculated by the ECU 230. The ECU 230 stores the deviation-expected path data in the memory 270 (S 130).

Meanwhile, the navigation system 20 detects the present position of the vehicle through the navigation sensor unit 220 (S 140).

The ECU 230 determines whether the present position of the vehicle deviates from the navigation path or not (S 150). When the present position of the vehicle deviates from the navigation path, the ECU 230 displays a revised navigation path through the audio processing unit 240 and/or the image processing unit 250 (S 160).

Either in case the present position of the vehicle does not deviate from the navigation path at the step 150 or in case the revised navigation path is displayed at the step 160, the ECU 230 determines whether or not the present position of the vehicle reaches the destination (S 170).

In case the present position of the vehicle reaches at the destination, an operation of the navigation system is completed (S 180). Otherwise, the ECU 230 performs again the step 120 to display the navigation path or the revised navigation path.

Figure 4:
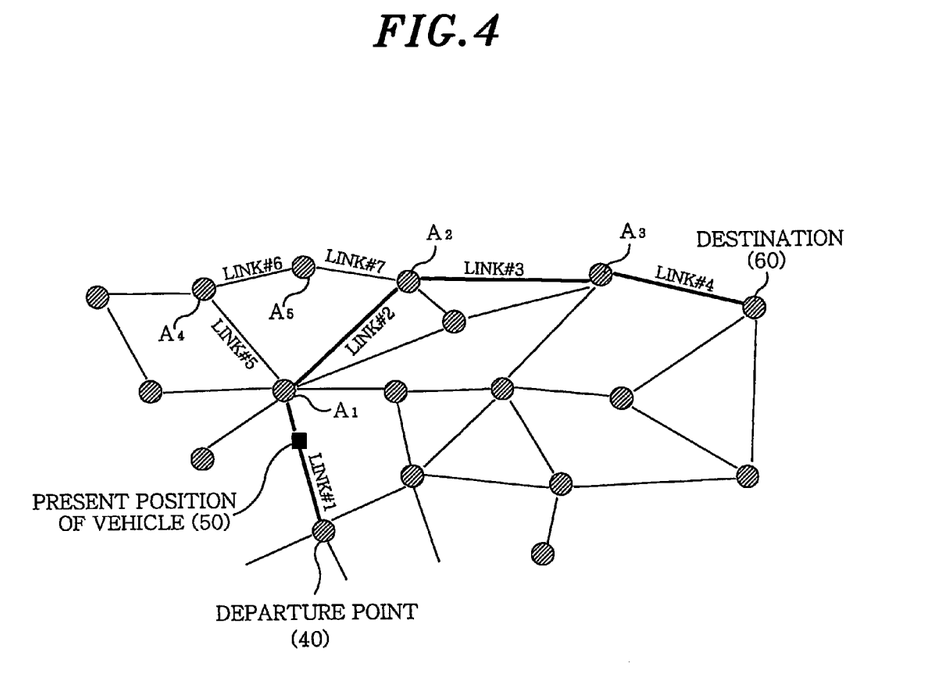
FIG. 4 describes a navigation path generated in accordance with the preferred embodiment of present invention.

FIG. 4 depicts exemplary navigation path generated by using the method in accordance with the present invention. As shown in FIG. 4, the navigation path is displayed on the screen by using thick lines drawn to represent links #1 to #4. The navigation path is composed of nodes such as A1, A2 and the like and links which are lines between the nodes.

There is no need to calculate the revised navigation path when the vehicle deviates from the navigation path. Since the deviation-expected paths are precalculated while the mobile object traveling along the navigation path, the navigation system 20 may display the revised navigation path immediately after the vehicle deviates from the navigation path. Herein, the deviation-expected paths are totally precalculated from optional points, selected among all the nodes and the links between the present position and the destination, to the destination. Therefore, in case the vehicle deviates from the navigation path at the deviation point, the revised navigation path is selected among the deviation-expected paths by inspecting which of the deviation-expected paths includes the present position of the vehicle. And then the revised navigation path is displayed from the deviation point to the destination immediately.

Figure 5A:
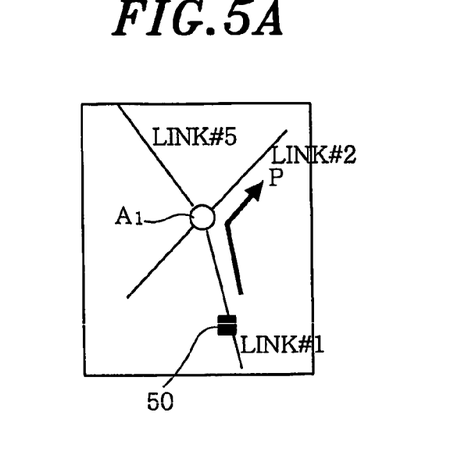
FIGS. 5A to 5C provide a procedure of displaying a revised navigation path, which has been precalculated in case a vehicle deviates from the original navigation path in accordance with the preferred embodiment of present invention.
Figure 5B:
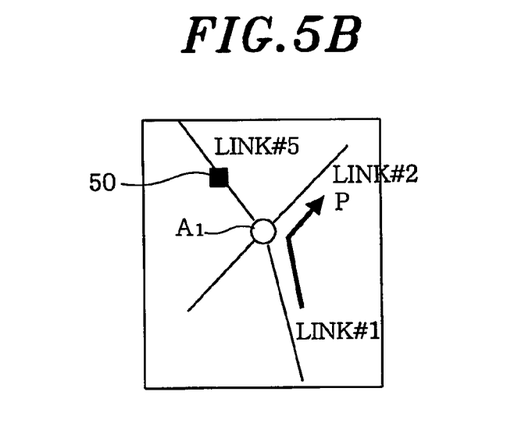
Figure 5C:
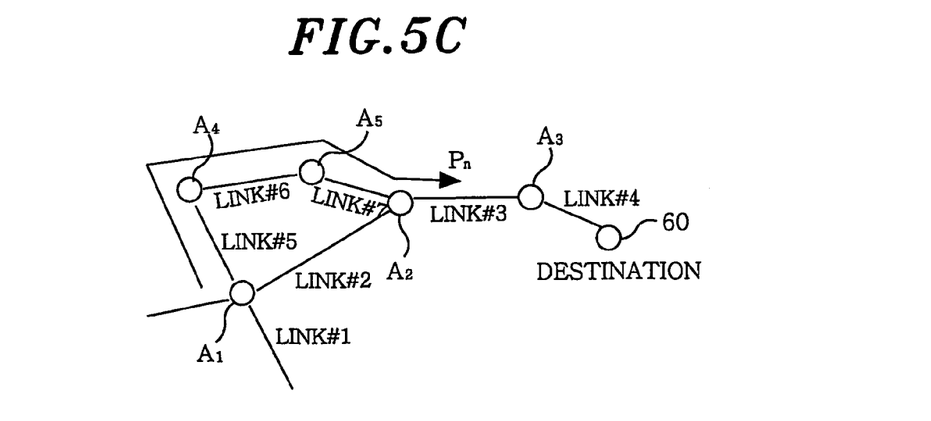

FIGS. 5A to 5C show a procedure of displaying the revised navigation path in case the vehicle deviates from the navigation path in accordance with the preferred embodiment of the present invention.

For example, suppose that the navigation path is displayed as shown in FIG. 4. The navigation path from a node 40, i.e., the departure point, to a node 60, i.e., the destination, includes the link #1, the node A1, the link #2, the node A2, the link #3, the node A3 and the link #4. In case the present position of the vehicle 50 is located on the link #1 as shown in FIG. 5A, the navigation system 20 guides the driver to follow the path data P, i.e., to enter the link #2, at the node A1.

However, in case the vehicle 50 deviates from the path data P by entering the link #5 as shown in FIG. 5B, the navigation system 20 displays the revised navigation path Pn from the link #5 to the destination (i.e., the link #5, the node A4, the link #6, the node A5, the link #7, the node A2, the link #3, the node A3, the link #4), immediately, because all the deviation-expected paths have been precalculated from the node A1 to the destination at the time while the vehicle travels along the link #1.

As described above, the navigation system and method in accordance with the present invention reduce a time delay which is required to acquire a revised navigation path by displaying the revised navigation path to the driver right after the vehicle deviates from the navigation path.

While the invention has been shown and described with respect to the preferred embodiments, it will be understood by those skilled in the art that various changes and modifications may be made without departing from the spirit and scope of the invention as defined in the following claims.

The invention claimed is:

1. A navigation system for use in a mobile object, comprising:
    a transceiver unit for transmitting a signal for demanding a detection of a navigation path, which is a short-cut path or an optimum path from a departure point to a destination, to a path detecting server via a wireless network and then receiving path data which represents the navigation path from the path detecting server via the wireless network;
    a display unit for outputting the navigation path or a revised navigation path;
    an input unit for inputting data on the departure point and the destination; and
    an electronic control unit (ECU) for transferring the data on the departure point and the destination from the input unit to the transceiver unit, transferring the path data from the transceiver unit to the display unit, precalculating deviation-expected path data which represent one or more deviation-expected paths in the course of driving along the navigation path, storing the one or more deviation-expected paths in a memory of the navigation system installed in the mobile object before the mobile object deviates from the navigation path, and selecting revised path data which represent the revised navigation path, among the one or more precalculated deviation-expected paths stored in the memory to thereby provide the revised navigation path to the display unit after a present position of the mobile object deviates from the navigation path,
    wherein the one or more deviation-expected paths are precalculated based on nodes and links connecting the nodes between the departure point and the destination.

2. The system of claim 1, further comprising a navigation sensor unit for detecting the present position of the mobile object.

3. The system of claim 2, wherein the display unit includes an audio processing unit for outputting the path data or the revised path data in the form of an audio signal and/or an image processing unit for outputting the path data or the revised path data in the form of an image signal.

4. The system of claim 3, wherein the ECU selects the revised path data among the one or more deviation-expected paths by inspecting which of the one or more deviation-expected paths includes the present position.

5. The system of claim 1, wherein the memory is provided for storing the path data and the deviation-expected path data which are transmitted from the ECU and transmitting the stored path data and the stored deviation-expected path data in case the ECU requires for the stored path data and the stored deviation-expected path data to display the stored path data and the stored deviation-expected path data through the display unit.

6. A method of navigating a mobile object traveling from a departure point to a destination by use of a navigation system installed in the mobile object, comprising the steps of:
    (a) transmitting a signal for demanding a detection of a navigation path, which is a short-cut path or an optimum path from the departure point to the destination, to a path detecting server via a wireless network;
    (b) receiving path data which represent the navigation path from the path detecting server via the wireless network;
    (c) displaying the navigation path in response to the received path data;
    (d) the navigation system precalculating deviation-expected path data which represent one or more deviation-expected paths, and storing the one or more deviation-expected paths in a memory of the navigation system installed in the mobile object before the mobile object deviates from the navigation path;
    (e) selecting revised path data, which represent a revised navigation path, among the one or more precalculated deviation-expected paths stored in the memory to thereby provide the revised navigation path to a display unit after a present position of the mobile object deviates from the navigation path; and (f) displaying the revised navigation path in response to the revised path data, wherein the one or more deviation-expected paths are pre-calculated based on nodes and links connecting the nodes between the departure point and the destination at the step (d).

7. The method of claim 6, further comprising a step of detecting the present position of the mobile object.

8. The method of claim 7, wherein the navigation path and the revised navigation path are outputted either in the form of an audio signal or in the form of an image signal at steps (c) and (f).

9. The method of claim 8, wherein the revised path data are selected among the deviation-expected path data by inspecting which of the deviation-expected paths includes the present position at step (e).

10. The method of claim 6, further comprising the steps of storing the path data in the memory after the path data is received and retrieving the stored path data or the stored one or more deviation-expected paths from the memory while displaying the navigation path or the revised navigation path.

* * * * *